Sept. 7, 1965　　　　　　B. THOMPSON　　　　　　3,205,463
ROTARY ELECTRIC TRANSFORMER
Filed Feb. 4, 1963　　　　　　　　　　　　　　5 Sheets-Sheet 4

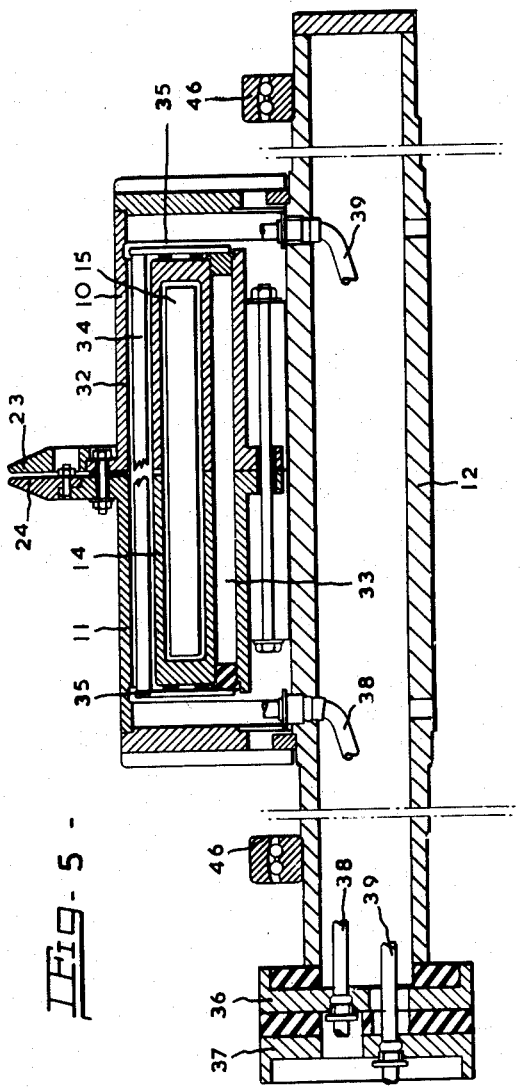

United States Patent Office 3,205,463
Patented Sept. 7, 1965

3,205,463
ROTARY ELECTRIC TRANSFORMER
Bernard Thompson, Sutton Coldfield, England, assignor to Tube Products Limited, Birmingham, England, a British company
Filed Feb. 4, 1963, Ser. No. 256,164
Claims priority, application Great Britain, Feb. 2, 1962, 4,216/62
9 Claims. (Cl. 336—62)

This invention relates to a new or improved electric transformer which is particularly adapted for use in electric welding but can be used for other purposes where a large current at low voltage is required.

According to our invention in its broadest aspect a transformer comprises a single turn secondary and a multi-turn primary winding of which the turns are formed by rods or tubes passing through spaced bores in the secondary and connected at their ends to form a toroidal winding.

This construction provides very close coupling and high mutual inductance between the primary and secondary so that the transformer has a low leakage inductance together with a relatively low current density in the secondary, resulting in a high efficiency.

The transformer can thus be built of minimum dimensions for a given capacity.

A transformer in accordance with our invention is particularly adapted for use with current of a relatively high frequency of 3,000 cycles or more per second. Current of such frequencies flows in a surface layer of a conductor of relatively small depth, the penetration becoming less as the frequency increases.

The primary current is carried by the outer surface layers of the rods or tubes and the secondary current by the surface layers of the bores in the secondary through which the rods or tubes pass. The secondary current path consists of a number of bores in parallel connection equal to the number of primary conductors so that the current density in the secondary is kept to a relatively low value and is not appreciably higher than the current density in the primary series conductors.

An iron core can be used for current frequencies up to about 10,000 cycles per second but for higher frequencies it is desirable to use a ferrite or like core. At the higher frequencies the core may be dispensed with completely at the cost of reduced mutual inductance but still retaining the high efficiency as a result of the low secondary current density.

Our improved construction lends itself particularly well to a rotary transformer for continuous resistance seam welding of tubes.

Figure 1:
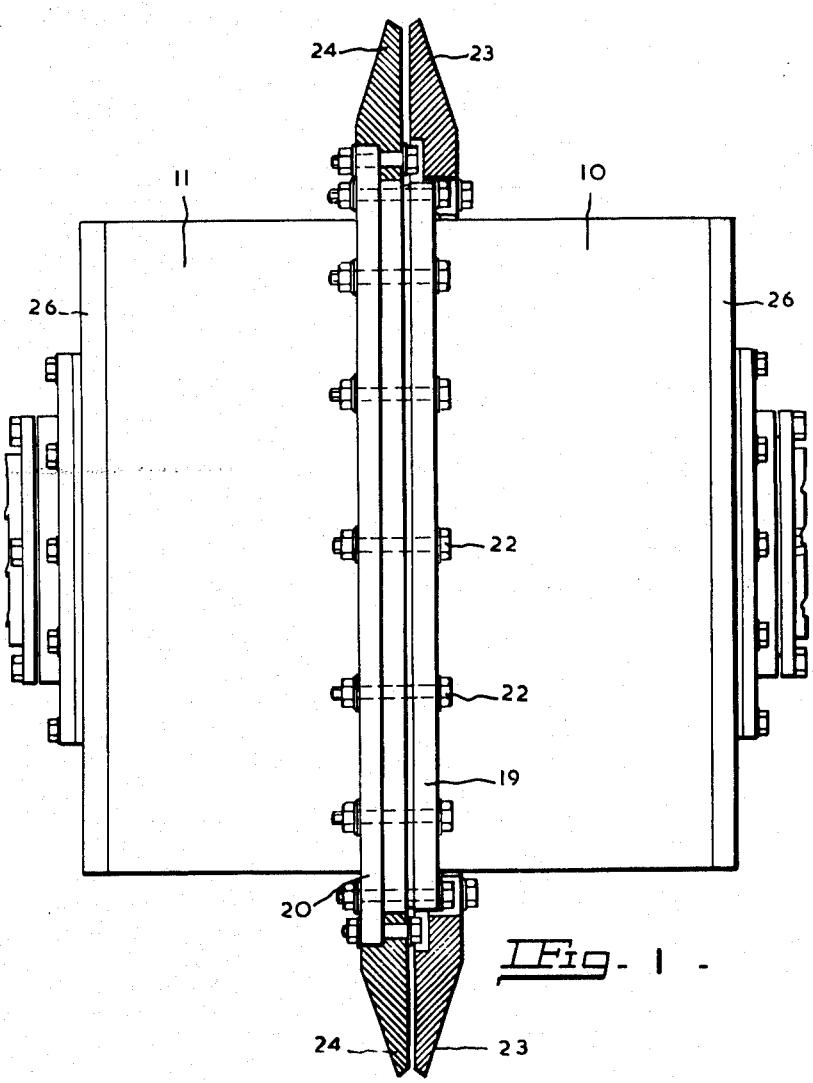
Figure 2:
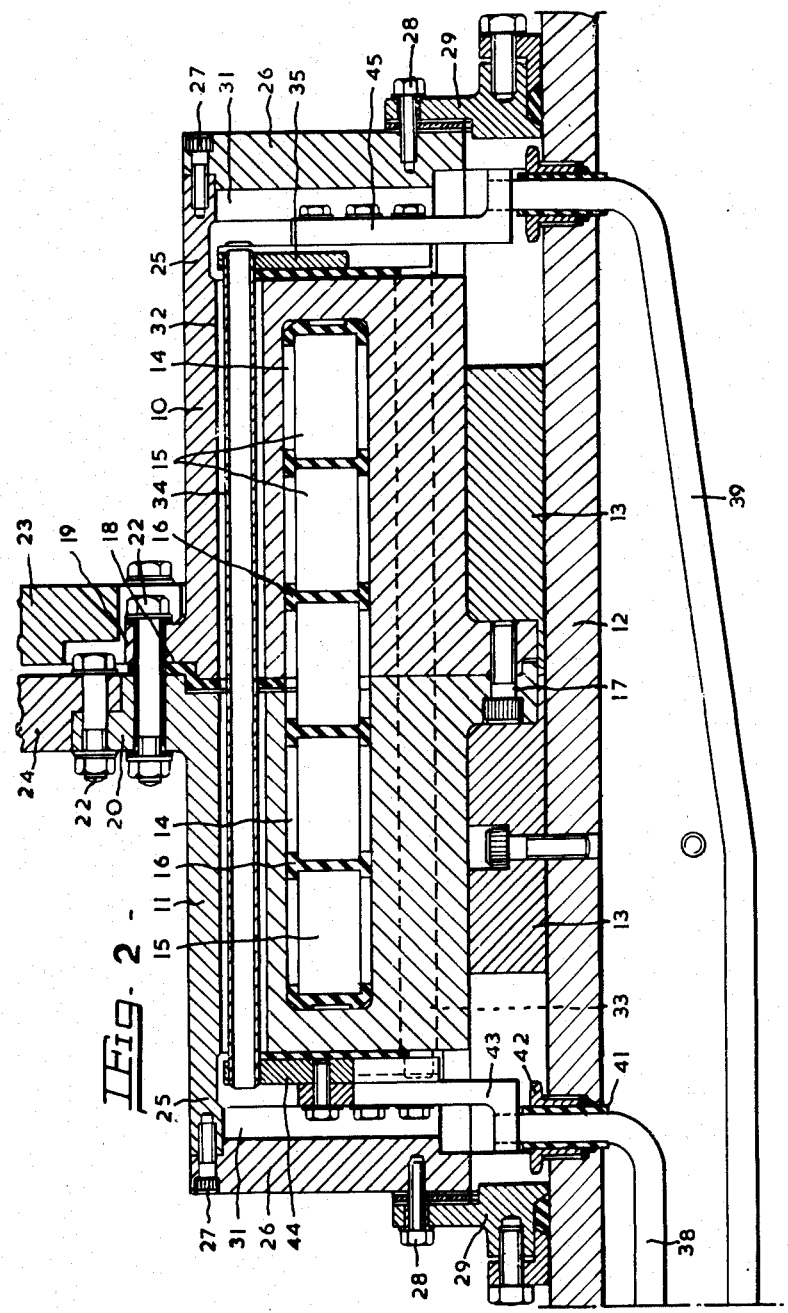
Figure 3:
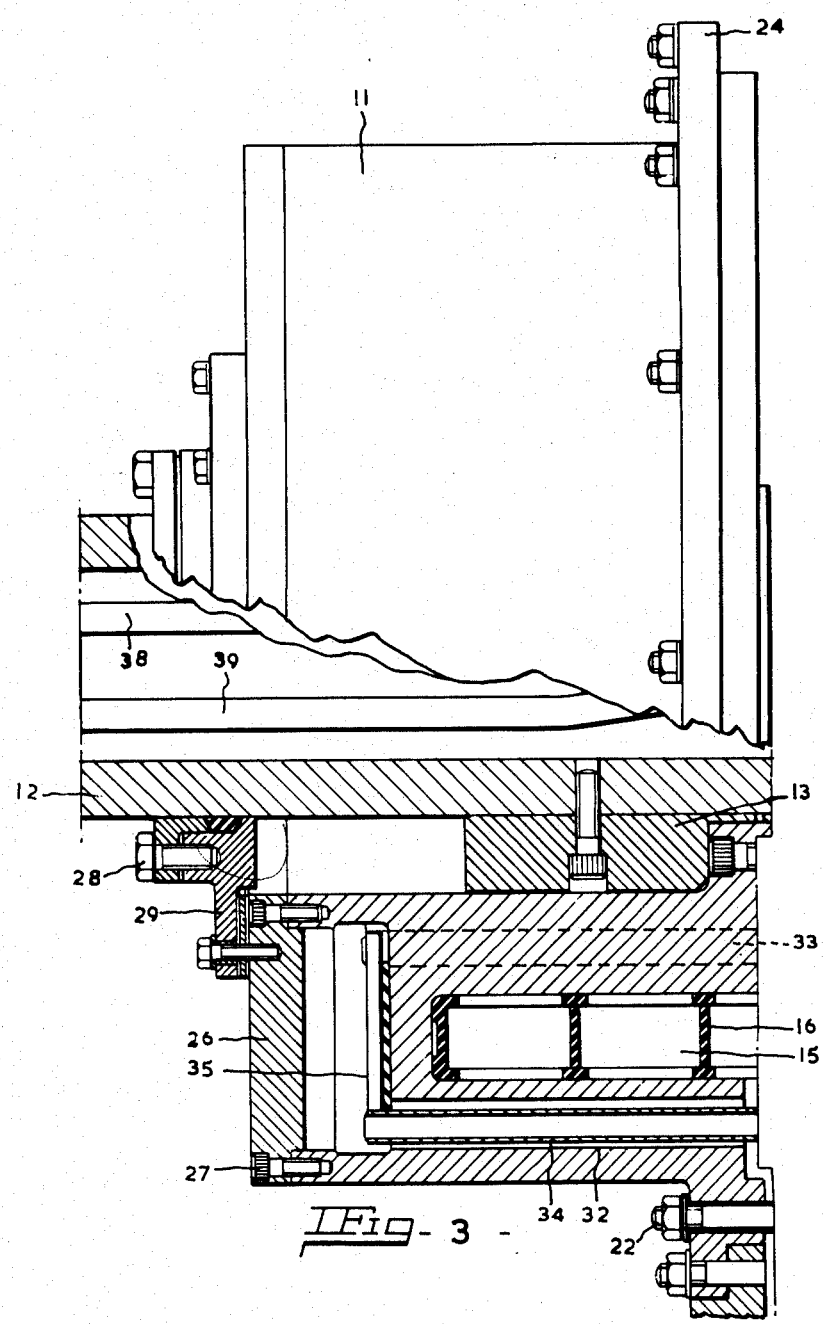
Figure 4:
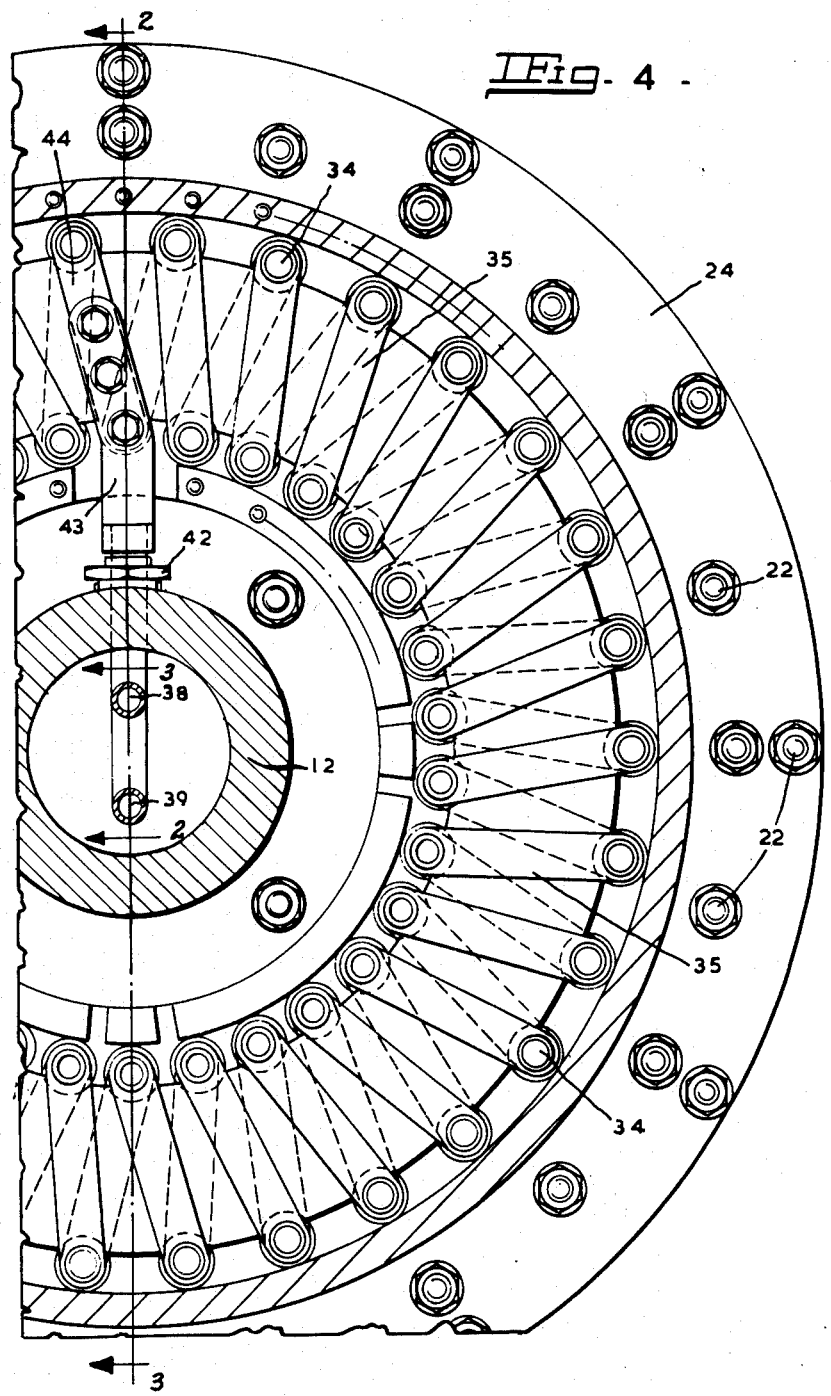

One form of rotary transformer in accordance with our invention designed for continuous tube welding is illustrated by way of example in the accompanying drawings, in which:

FIGURE 1 is a side elevation of the transformer showing the electrodes in section, FIGURE 2 is a longitudinal section of the transformer, taken substantially along the line 2—2 of FIG. 4, FIGURE 3 is a cross-sectional view partly in elevation taken substantially along the line 3—3 of FIG. 4, FIGURE 4 is an end elevation of the transformer with the cover removed, FIGURE 5 is a diagrammatic longitudinal section of the transformer showing the connections for feeding current to the primary and for supplying coolant.

In the transformer illustrated the secondary comprises two co-operating hollow cylindrical members 10, 11 secured together in axial alignment and mounted on a hollow shaft 12 from which they are spaced by sleeves 13 of insulating material such as resin-bonded fibre-glass.

An annular recess 14 extends axially from the inner end of each member, the recesses combining to form a closed annular chamber to receive a core. The core is formed by a series of rings 15 separated by spacers 16 of insulating material.

The meeting faces of the two members 10, 11 are in engagement over their radially innermost parts where they are secured together by bolts 17, but the radially outermost portions of the faces on the outer side of the core are spaced a short distance apart and are separated by insulating material 18. On opposite sides of the gap there are radially projecting annular flanges 19, 20 to which are secured by bolts 22 annular electrodes or contact members 23, 24 for engagement in the known manner with the surface of a tube to be welded. This arrangement provides a short distance path having low inductance and resistance between the secondary and the points of engagement of the electrodes with the tube to be welded.

At the outer end of each of the members 10, 11 of the secondary there is an axially extending flange 25 flush with the outer surface of the member, and a copper end plate 26 abuts against this flange to which it is secured by bolts 27. The plates are secured by bolts 28 to, but are insulated from, flanged bushes 29 mounted on the shaft so there is a closed annular chamber 31 between each end plate and the adjacent ends of the members 10 and 11, inside the flanges 25.

Two rings of angularly spaced bores 32 and 33 are drilled longitudinally through the secondary parallel to its axis, the bores being located on the outer and inner side respectively of the core chamber, and the number of bores in each ring corresponding to the required number of turns in the primary winding of the transformer.

A tube 34 of a diameter substantially less than that of the bore extends axially through each bore, and the end of each tube in the outer ring is coupled by a link 35 to the end of an adjacent tube in the inner ring as shown more particularly in FIGURE 4, the connections being so arranged that the tubes and links form a toroidal primary winding. The tube in one bore in the inner ring is omitted and the ends of the winding terminate at opposite ends of the secondary to receive the leads for the primary current.

Current from any convenient source is supplied to insulated slip rings 36, 37 mounted on one end of the hollow shaft 12 and the current is taken from the slip rings to opposite ends of the primary winding by copper tubes 38, 39 carried through the hollow shaft into the chambers at opposite ends of the secondary, these tubes preferably being of the same diameter as the tubes forming the primary winding. The end of the tube 38 remote from its slip ring is taken through an insulating sleeve 41 in a fitting 42 screwed into a radial opening in the shaft and is connected by a copper bar 43 to a short link 44 on one end of the primary winding, and the tube 39 is connected by a copper bar 45 to the other end of the winding.

The tubes 38 and 39 also form flow and return pipes for oil or other coolant which is circulated through the transformer. The coolant may be arranged to flow through the tubes forming the primary winding as well as well as through the annular space between the tubes and the bores in the secondary, or the ends of the tubes may be blanked off so that the coolant only flows over the outer surfaces of the tubes and the inner surfaces of the bores where, due to the limited current penetration depth, the current density and hence the heating effect of the current are at a maximum.

If rods are used instead of tubes for the primary winding the coolant will of course only flow between the rods and the walls of the bores through which they extend.

In an alternative arrangement the return flow of the coolant may be taken through the hollow shaft.

For continuous tube welding the shaft will be mounted to rotate in bearings 46 in any convenient mounting adjacent to the weld point of the tube with the electrodes or contact members 23, 24 in engagement with the surface of the tube on opposite sides of the seam, the output current from the secondary of the transformer being concentrated in the electrodes by which it is applied to the tube.

I claim:

1. An electric transformer comprising a single turn secondary, spaced parallel bores in the secondary, conductors extending through said bores, and connections between the ends of conductors in adjacent bores linking said conductors to form a multi-turn primary winding.

2. An electric transformer comprising a cylindrical single turn secondary, two radially spaced rings of angularly spaced bores extending through said secondary parallel to its axis, rigid conductors of smaller cross-section than said bores extending axially through the bores, and links connecting the ends of the conductors in the bores of each ring to the ends of the conductors in adjacent bores of the other ring to form a continuous toroidal primary winding, the number of bores in each ring corresponding to the desired number of turns in the primary winding.

3. An electric transformer as in claim 2 wherein said conductors are tubes of an external diameter substantially less than the internal diameter of the bores in the secondary.

4. An electric transformer as in claim 2 wherein said secondary comprises two co-operating hollow cylindrical members secured together in axial alignment, the meeting faces of the two members being in engagement over their radially innermost parts and being spaced apart over their radially outermost parts.

5. An electrical transformer as in claim 2 wherein said secondary incorporates an annular chamber and a core in said chamber, and said rings of bores are respectively located on the outer and inner sides of said chamber.

6. A rotary electric transformer comprising a rotatable hollow shaft, a cylindrical single-turn secondary mounted on and insulated from said shaft, two radially spaced rings of angularly spaced bores extending through said secondary parallel to its axis, rigid conductors of smaller cross-section than said bores extending axially through the bores, links connecting the ends of the conductors in the bores of each ring to the ends of the conductors in the adjacent bores of the other ring, said conductors and links forming a continuous toroidal primary winding, slip rings mounted on and insulated from said shafts and adapted to receive electric current from any convenient source, and tubes located within said shaft and connecting said slip rings to opposite ends of said primary winding.

7. A rotary electric transformer as in claim 6 wherein said tubes are connected to opposite ends of said primary winding within chambers at opposite ends of said secondary and said tubes serve as flow and return pipes for the circulation of coolant through the transformer, said chambers being in communication through the bores in the secondary.

8. A rotary electric transformer as in claim 6 wherein said conductors extending through the bores in the secondary comprise tubes of an external diameter substantially less than the internal diameter of the bores in the secondary.

9. A rotary electric transformer as in claim 6 wherein said secondary incorporates a peripheral gap at the middle of its axial length, radially projecting flanges on each side of the gap, and annular radially projecting electrodes secured to said flanges.

References Cited by the Examiner
UNITED STATES PATENTS

| | | | |
|---|---|---|---|
| 2,479,370 | 8/49 | Kenyon et al. | 336—62 X |
| 3,040,162 | 6/62 | Hunter | 336—62 X |

JOHN F. BURNS, *Primary Examiner.*

LARAMIE E. ASKIN, *Examiner.*